June 9, 1953     J. O. JACKSON     2,641,628
POTHEAD
Filed April 5, 1948     2 Sheets-Sheet 1

INVENTOR.
James O. Jackson
BY Green, McCallister & Miller
His Attorneys

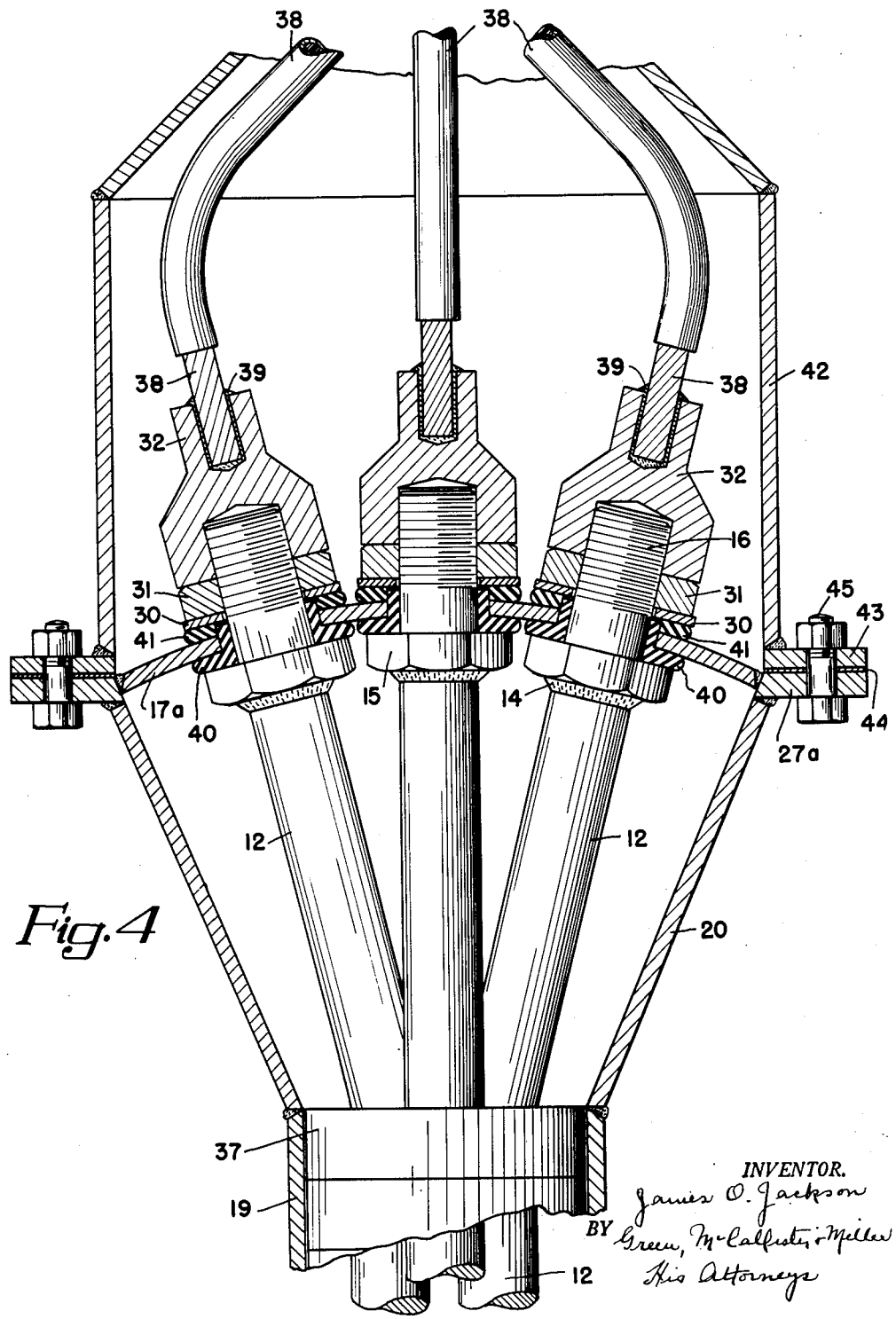

Patented June 9, 1953

2,641,628

UNITED STATES PATENT OFFICE 2,641,628

POTHEAD

James O. Jackson, Crafton, Pa., assignor to Pittsburgh-Des Moines Company, a corporation of Pennsylvania Application April 5, 1948, Serial No. 18,882

8 Claims. (Cl. 174—75)

This invention relates to potheads or electrical terminal structures.

Potheads or electrical terminal structures capable of operating under any desired pressure have long been known but so far as I am aware, no such structure has been capable of operating satisfactorily under both elevated pressures and elevated temperatures.

One object of this invention is to produce improved potheads for conducting electrical energy from an outside source to electrical equipment located within a hollow structure such as a heat accumulator and exchanger, or the like operated at elevated temperatures and pressures.

Another object is to produce an improved means for conducting electrical energy from an outside source to resistance heating elements located within a heat exchanger and accumulator or the like operated at elevated temperatures and superatmospheric pressure.

These and other objects I attain by means of the structures described in the specification and illustrated in the drawings accompanying and forming part of this application.

In the drawings:

Fig. 4 is an enlarged view partially in elevation and partially in section of a modified form of pothead embodying certain features of this invention.

The pothead of this invention is designed to conduct electrical energy to electrical equipment located within a hollow structure operating at elevated pressures and elevated temperatures, a structure such as the heat accumulator and exchanger of my application Serial No. 10,139, now Patent 2,556,495.

In a general way, the pothead of this invention comprises the electrical conductors which extend outwardly from bus bars or other equipment within the hollow structure, through an opening in a wall of such structure and to an appreciable distance beyond such wall; a diaphragm through which such conductors or extensions of such conductors extend; a metal conduit surrounding and spaced from such conductors and having one end thereof secured to the wall of the hollow structure around the opening through which the conductors pass (the opposite end of such conduit having connection with such diaphragm in a pressure-tight manner), and means for sealing the openings in the diaphragm surrounding the conductors or their extensions whereby the interior of the conduit—which is open to the pressure within the hollow structure—is sealed from the atmosphere by means of such diaphragm and such sealing means.

Figure 1:
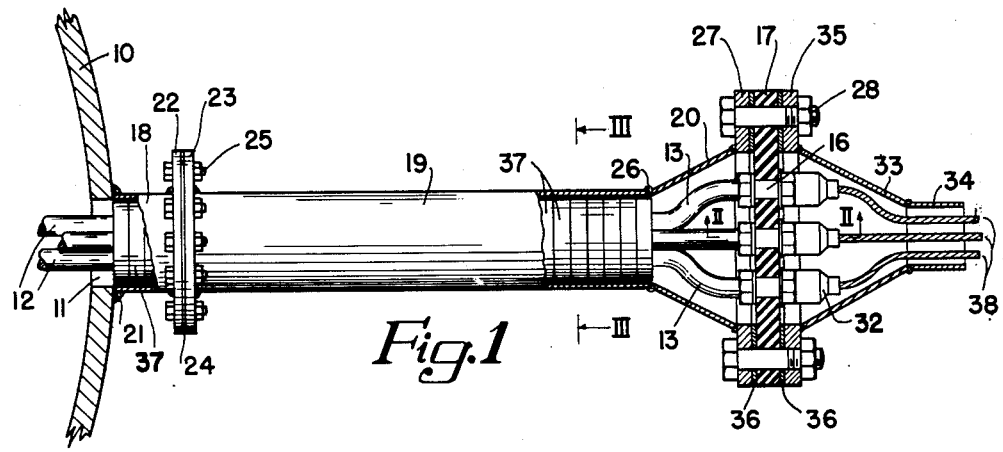
Figure 1 is a view partially in longitudinal section and partially in elevation of a pothead structure embodying this invention.
Figure 2:
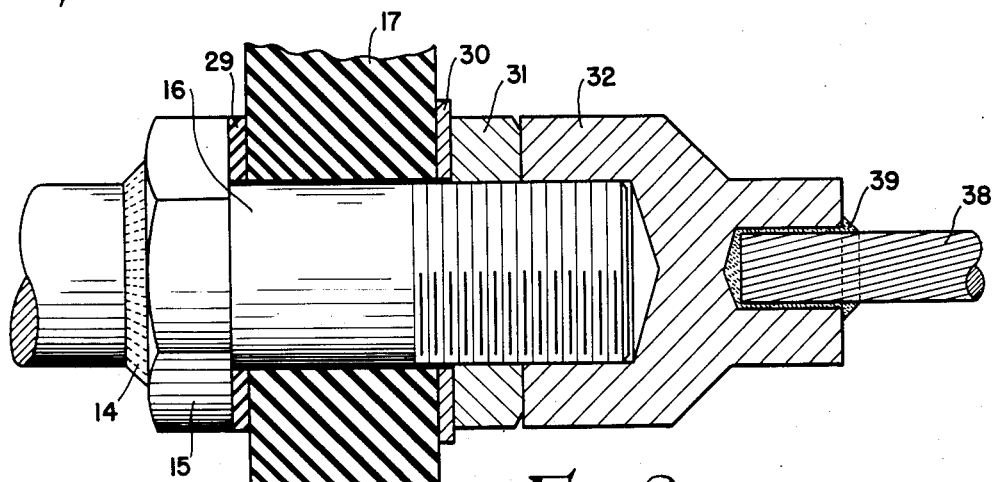
Fig. 2 is an enlarged fragmentary view partially in section and partially in elevation of a portion of the pothead structure of Fig. 1.
Figure 3:
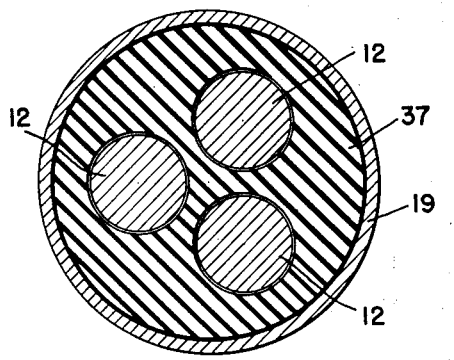
Fig. 3 is an enlarged cross sectional view of a portion of the pothead structure of this invention.

Referring to Figs. 1 to 3 of the drawings, 10 represents a metal wall of a hollow structure operating at elevated pressures and temperatures, such a structure as the heat accumulator and exchanger of my said application. Such wall is provided with an opening 11 through which the three conductors 12 extend. These conductors which are subjected to the high temperatures within the hollow structure (heat accumulator and exchanger), are preferably made from a material having resistance to corrosion at the operating temperatures and having relatively high resistance to thermal conduction. A chromium nickel iron alloy of the "18–8" type meets these requirements admirably. Alloys of the 18–8 type contain about 18% chromium and 8% nickel with the balance principally iron.

Conductors 12 are straight and parallel for an appreciable distance, and then each is provided with a bend 13 adjacent its outer end. The outer end of each conductor 12 is welded as at 14 to the head 15 of a metallic bolt 16. These bolts extend through openings formed for their reception in a diaphragm 17 which is preferably made from electrical insulating material such as Micarta which is a phenolic condensation product.

A metallic conduit preferably comprising three sections 18, 19 and 20, has its inner end welded, as at 21, to wall 10 surrounding opening 11. Conduit sections 18 and 19 are provided with cooperating flanges 22 and 23 between which a heat resisting gasket 24 is secured by the flange bolts 25. Conduit section 20, which is welded to the outer end of section 19 as at 26, flares outwardly and has its outer end welded to a flange 27 which extends at right angles to the major axis of the conduit and is provided with a circular row of holes for receiving bolts 28.

Bolts 16 extend through openings in diaphragm 17 and a heat resisting gasket 29 is positioned between the head 15 of each such bolt and diaphragm 17. A metallic washer 30 surrounds each bolt on the opposite side of the diaphragm from gaskets 29 and the bolts are pulled up tightly by means of metallic nuts 31 which are threaded thereto.

A connecting lug 32 preferably made of copper, is threaded to the outer end of each bolt 16.

Diaphragm 17 is provided with a circular row of bolt holes for receiving bolts 28 and with three holes for receiving bolts 16.

A metallic reducing section 33 forming part of the housing of the pothead has its small end welded to a coupling member 34 which is suitable for attachment to an electrical power conduit. The large end of this section 33 is welded to a flange 35 similar to flange 27 and pressure-tight gaskets 36 are positioned between diaphragm 17 and flanges 27 and 35.

In order to keep conductors 12 separated from one another and from the conduit so that they are electrically insulated from one another and from the conduit, sections 18 and 19 of the conduit are filled with closely packed cylindrical disks 37 formed of material which is an electrical insulator and also a heat conductor, a material such as Mycalex which is a composition containing mica and lead borate glass. Disks 37 as shown in Fig. 3 are provided with three holes for the three conductors which, within sections 18 and 19 of the conduit, are triangularly arranged. Disks 37 are preferably slipped over conductors 12 before such conductors are welded or otherwise connected to the bus bars or other equipment within the hollow structure.

An electrical conductor 38 (copper cable or the like) is preferably silver brazed, as at 39, into a hole formed for its reception in the outer end of each connecting lug 32.

In one installation in which I used a pothead such as disclosed in Figs. 1-3 for conducting electric current to bus bars located within a heat accumulator and exchanger such as disclosed in my said application, the pothead has to operate under temperatures ranging up to 550° F. and under a pressure of 110 pounds per square inch gauge.

In such installation, the conductors 12, arranged as disclosed in Fig. 3, are 1⅜ inches in diameter. These and bolts 16 which are also 1⅜ inches in diameter and are made from a chromium nickel iron alloy of the "18-8" type.

Sections 18 and 19 of the conduit are made from five inch nominal pipe size steel pipe. Disks 37 are Mycalax and are about 4⅞ inches in diameter and one inch thick. They are packed closely together and entirely fill sections 18 and 19 of the conduit. The distance between flanges 23 and 27 is approximately 6 feet. Connection 34 is coupled to a power conduit (not shown) which supplies the electrical energy required for resistance heating units located within the heat accumulator and exchanger. Such conduit carries about 210 kw. on a 60 cycle, 3 phase 220 volt A. C. circuit.

Diaphragm 17 which is made of Micarta is approximately 1½ inches thick and in order to maintain its mechanical strength it is necessary to establish a relatively large drop in temperature between the heat accumulator and exchanger and such diaphragm. This is accomplished partly by the long conduit and partly by disks 37 which conduct heat from conductors 12 to the conduit wall through which it passes to the atmosphere.

The length of the conduit to be used depends on the temperature drop required. The longer the conduit, the greater will be the temperature drop. Although a metallic conduit is a fairly good conductor of heat, a relatively long conduit affords a barrier to heat flow from the hot hollow structure to diaphragm 17.

Where space limitations prevent the use of a relatively long conduit, a shorter conduit provided with heat radiating fins for dissipating the heat to the atmosphere by radiation and convection may be found suitable.

In the modified structure of Fig. 4, a steel diaphragm 17a formed as a section of a hollow sphere, is welded to flange 27a, such flange being welded to the large end of conduit section 29.

Conductors 12 instead of being bent as in Fig. 1, have their ends spread apart and welded to bolts 16 which extend through openings in the diaphragm.

Flanged bushings 40 made of flexible electrically insulating material are inserted through the openings in the diaphragm either before bolts 16, which form extensions of conductors 12, are inserted through such openings or they may be placed on the bolts before they are inserted. Flexible electrically insulating washers or gaskets 41 surround the extended ends of such bushings, and, with such bushings form flexible electrically insulating spool-like seals. Metallic washer 30 bears against the outer face of each flexible washer or gasket 41 and when metallic nuts 31 are screwed home, since they bear against metallic washers 30, the openings in the diaphragm around conductors 12 are effectively sealed against the pressures within the conduit and in this manner, the interior of the conduit is sealed from the atmosphere.

Connecting lugs 32 into which the power cables are brazed are secured on bolts 16 as in the preferred embodiment of the invention as shown in Figs. 1-3.

A housing member 42 takes the place of reduced section 33 of Fig. 1 and is provided with a flange 43 which is bolted to flange 27a; a flexible gasket 44 being positioned between such flanges and held in place by bolts 45.

What I claim is:

1. In a device for transmitting electric current to the interior of a hollow structure adapted to operate at elevated temperatures and in combination with such a hollow structure, multiple spaced bare electrical conductors which are subjected to such elevated temperatures and extend outwardly from the interior of such hollow structure through and beyond an opening in one of its walls and which throughout the major part of their length beyond such wall are straight and parallel and have their outer ends spread apart; a diaphragm through which such spread apart ends extend, a metallic conduit comprising a straight portion, which surrounds and parallels the straight portions of such conductors, and a flaring outer end portion, which surrounds and is spaced from the spread apart ends of such conductors and connects with an outer peripheral portion of such diaphragm, and multiple disks of electrically insulating and heat conducting material having substantially flat parallel ends and being provided with through openings for said electrical conductors which are located on the straight parallel portions of such conductors, contact the inner surface of the straight portion of such conduit, and substantially fill such straight portion so that a relatively large drop in temperature occurs in the electrical conductors between the point at which each passes through the opening in the wall of the hollow structure and the point at which each enters such diaphragm.

2. A structure as defined in claim 1, in which the diaphragm is metallic and insulating means are provided forming pressure-tight joints between such conductors and such diaphragm.

3. A structure as defind in claim 1, in which there are three metallic electrical conductors within the conduit and these parallel one another throughout the major part of their lengths and are so arranged that straight lines connecting their axes and lying in a plane perpendicular thereto define an equilateral triangle.

4. A structure as defined in claim 1 in which the metallic conduit has one end thereof attached in a pressure-tight manner to the wall of the hollow structure surrounding the conductor opening therein and the opposite end thereof is secured in a fluid-tight manner to the outer peripheral portion of the diaphragm.

5. A structure as defined in claim 1, in which the joints between the conductors and walls of the openings in the diaphragm for such conductors are sealed in a pressure-tight manner.

6. A structure as defined in claim 1 in which the conductors are made from a chromium nickel iron alloy of the 18-8 type.

7. A structure as defined in claim 1 in which the diaphragm is formed of a phenolic condensation product.

8. A structure as defined in claim 1 in which the cylindrical disks are made from a composition of mica and lead borate glass.

JAMES O. JACKSON.

References Cited in the file of this patent

UNITED STATES PATENTS

| Number | Name | Date |
|---|---|---|
| 251,729 | Patterson | Jan. 3, 1882 |
| 266,353 | Delany | Oct. 24, 1882 |
| 1,152,005 | Clark | Aug. 31, 1915 |
| 1,176,739 | Davis | Mar. 28, 1916 |
| 1,802,584 | Steinmayer | Apr. 28, 1931 |
| 1,889,545 | Edmonds | Nov. 29, 1932 |
| 1,974,298 | Case | Sept. 18, 1934 |
| 1,996,646 | Juthe et al. | Apr. 2, 1936 |
| 2,179,781 | Frankel et al. | Nov. 14, 1939 |
| 2,247,671 | Tepel | July 1, 1941 |
| 2,253,981 | Peyches | Aug. 26, 1941 |
| 2,295,214 | Jackson | Sept. 8, 1942 |
| 2,323,792 | Cattaneo | July 6, 1943 |
| 2,329,961 | Walker | Sept. 21, 1943 |
| 2,381,218 | Jacob | Aug. 7, 1945 |
| 2,439,394 | Lanzallotti et al. | Apr. 13, 1948 |

FOREIGN PATENTS

| Number | Country | Date |
|---|---|---|
| 239,442 | Switzerland | Feb. 1, 1946 |
| 372,343 | Germany | Mar. 26, 1923 |